UNITED STATES PATENT OFFICE.

HENRY BERG, OF JERSEY CITY, NEW JERSEY.

PAINT COMPOSITION.

SPECIFICATION forming part of Letters Patent No. 241,911, dated May 24, 1881.

Application filed January 31, 1881. (Specimens.)

*To all whom it may concern:*

Be it known that I, HENRY BERG, of Jersey City, in the county of Hudson and State of New Jersey, have invented certain new and useful Improvements in Paint Compositions, of which the following is a specification.

This invention relates to an improved paint composition by which a durable enamel-like coating may be given to the surface of wrought and cast iron articles of all kinds, the same being specially applicable to vacuum-pans, filters, tanks, and other parts of sugar and oil refineries, chemical-factories, and the like.

The invention consists of a mixture of white lead, Venetian red, and ground metallic iron with varnish, turpentine, brown japan, and a liquid drier.

The paint composition is prepared in the following manner and proportions, to wit: one hundred pounds of the best white lead, sixteen pounds of ground metallic iron, and four pounds of Venetian red are mixed with six gallons of varnish, two gallons of turpentine, one gallon of brown japan, and one gallon of liquid drier, preferably japan, which ingredients are thoroughly stirred together until they are uniformly dissolved. The composition is gradually heated under continual stirring in a kettle up to a temperature of about 210° Fahrenheit, and then allowed to cool slowly. It is then ready to be applied to the metallic surfaces, and is put on with a brush in the usual manner. It dries in from twelve to twenty-four hours, according to the temperature of the atmosphere, and forms a very durable enamel-like coating for iron surfaces of all kinds.

Having thus described my invention, I claim as new and desire to secure by Letters Patent—

A paint composition consisting of white lead, ground metallic iron, Venetian red, varnish, brown japan, turpentine, and a liquid drier, prepared in the manner and proportions substantially as and for the purpose set forth.

In testimony that I claim the foregoing as my invention, I have signed my name, in presence of two witnesses, this 27th day of January, 1881.

HENRY BERG.

Witnesses:
PAUL GOEPEL,
CARL KARP.